(12) United States Patent
Greene

(10) Patent No.: US 10,028,012 B2
(45) Date of Patent: Jul. 17, 2018

(54) APPARATUS, SYSTEMS AND METHODS FOR AUDIO CONTENT SHUFFLING

(71) Applicant: EchoStar Technologies L.L.C., Englewood, CO (US)

(72) Inventor: Gregory Greene, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 767 days.

(21) Appl. No.: 14/586,397

(22) Filed: Dec. 30, 2014

(65) Prior Publication Data

US 2016/0188286 A1 Jun. 30, 2016

(51) Int. Cl.
*H04N 21/439* (2011.01)
*H04N 21/482* (2011.01)
*G11B 27/00* (2006.01)

(52) U.S. Cl.
CPC .......... *H04N 21/439* (2013.01); *G11B 27/00* (2013.01); *H04N 21/4825* (2013.01)

(58) Field of Classification Search
CPC .................................................. H04N 21/439
See application file for complete search history.

(56) References Cited

U.S. PATENT DOCUMENTS

| 2011/0239253 | A1* | 9/2011 | West | H04N 21/234363 |
| | | | | 725/46 |
| 2013/0003993 | A1* | 1/2013 | Michalski | H04H 20/74 |
| | | | | 381/119 |

\* cited by examiner

*Primary Examiner* — Jennifer N To
*Assistant Examiner* — Ashley M Fortino
(74) *Attorney, Agent, or Firm* — Lowe Graham Jones PLLC

(57) ABSTRACT

Song shuffling system plays a series of songs selected from a shuffled plurality of predefined audio content sources. An exemplary embodiment concurrently receives, during a shuffle operation, a stream of audio content from each of the predefined audio content sources, wherein each of the streams of audio content comprises a plurality of serially received songs. Each song is stored by the media device as the song is received. A first predefined audio content source is selected from the predefined audio content sources. Then, a first song is selected having a beginning portion that is stored in the memory medium and that was provided by the selected first predefined audio content source. A second predefined audio content source is selected from the predefined audio content sources that is to provide a second song that is to be presented to the user upon conclusion of the presentation of the first song.

15 Claims, 5 Drawing Sheets

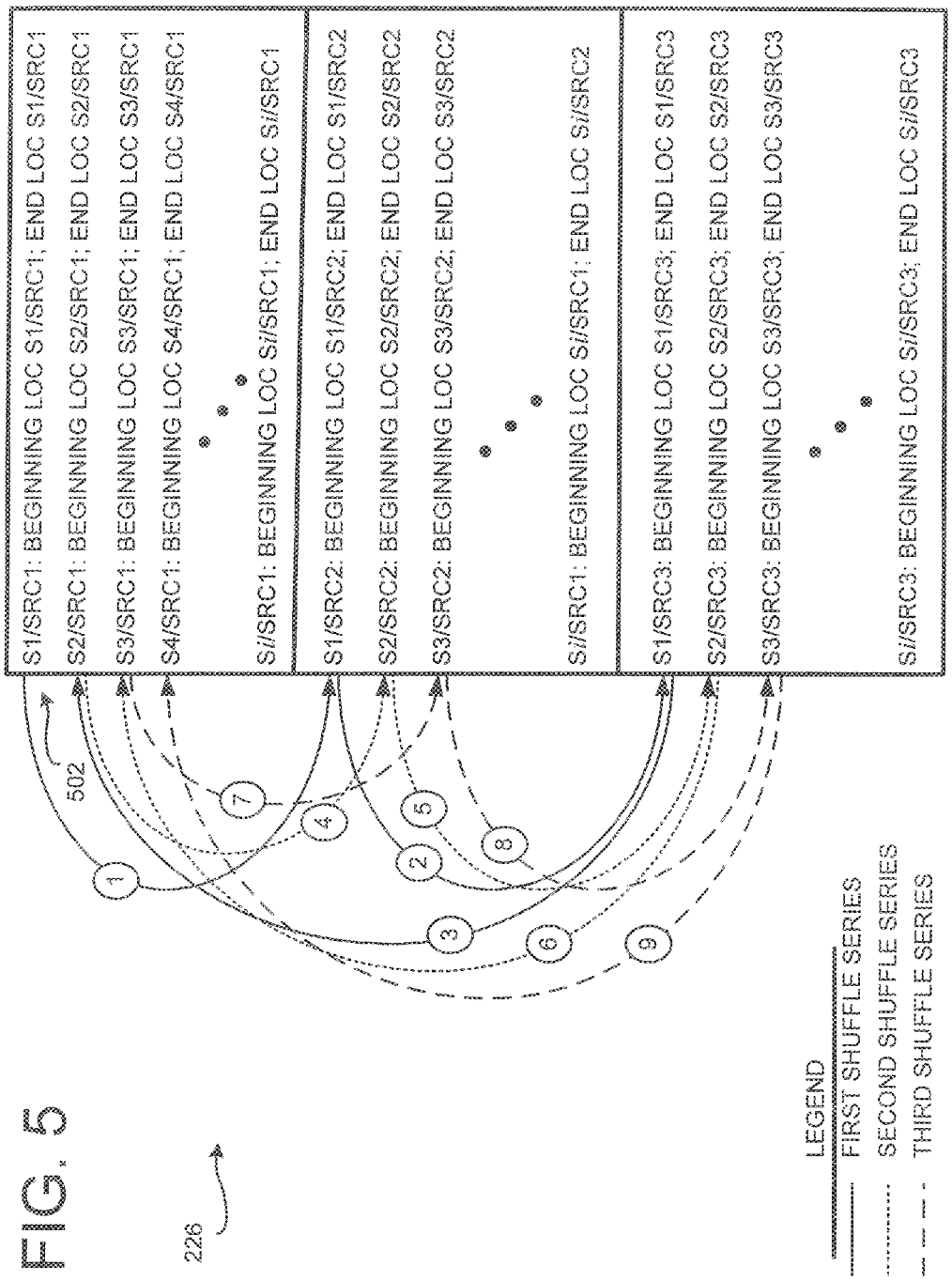

APPARATUS, SYSTEMS AND METHODS FOR AUDIO CONTENT SHUFFLING

BACKGROUND

Media devices, such as a set top box, a cellular phone, a smart phone, a notepad, a stereo, a radio, a television, a computer system, a game system, or the like, are often configured to present audio content. The audio content is received in a content stream communicated from a remote source to the media device via a content delivery system. The received audio content is processed and is then communicated to a sound reproducing device, such as a speaker, headphone or the like. The particular source of the audio content is specified by a user who is listening to the audio content.

The audio content typically comprises a series of individual songs. A song is a composition of music performed by one or more artists who may be singing and/or playing a musical instrument. The song has a discernible beginning and an end. Thus, a stream of audio content comprises a series of songs, where a next song begins after a conclusion of a previous song. There may be intervening commentary by a person or intervening commercial advertisements or messages disposed between songs of the audio content, such as typically encountered in a broadcast audio content medium.

Audio content sources include any provider of audio content. A non-limiting example of an audio content provider is a radio station that broadcasts audio content over the air to a media device. Here, the audio content delivery system employs over-the-air wireless signals that are detected by a radio frequency (RF) tuner, such as typically found in a radio or the like.

The audio content may be communicated using other audio content delivery systems. For example, but not limited to, a satellite system may broadcast audio and/or video content in a satellite signal that is received by the media device. As another example, the audio content may be communicated over cable system using a wire-based signal. In yet another example, the audio content may be communicated from a web site to the media device 102 via the Internet, or may be communicated to the media device via a wireless system the employs a cellular phone signal and/or a Wi-Fi signal.

Other exemplary audio content delivery systems may include an electronic device that is communicatively coupled to the media device. Here, the electronic device accesses the audio content from a memory medium. For example, but not limited to, the audio content may be communicated to the media device from a digital video recorder (DVR) player or a compact disc (CD) player that is playing a CD, DVD, or the like. As another example, a flash memory device may be accessing previously stored audio content that has been saved into the flash memory. Other examples include audio content provided by a record player (playing a record) or a cassette tape player (playing a cassette tape).

In some situations, the user may wish to listen to a constantly changing variety of audio content. CD players have been devised to provide a random and constantly changing stream of audio content, referred to as "shuffling" in the arts. Here, a plurality of CDs reside in the CD player. The CDs are shuffled in and out of the CD optical reader component of the CD player so that a continuing and changing stream of individual songs, in their entirety, are played to the user. Some embodiments may select songs at random from the different CDs. Alternatively, songs may be selected in a predefined order from the different CDs.

As another example, "shuffling" of songs may be implemented when a single source of audio content is providing the audio content. For example, a web site or the like may have a large repository of individual songs. Songs from the repository can be selected in a manner that emulates shuffling. The "shuffled" series of songs may then be communicated to the user's media device 102 for presentation to the user.

However, there is no practical way to provide shuffling of audio content from a plurality of broadcasting audio content providers in a manner that plays songs in their entirety. Radios are known to have a "shuffle" function wherein the radio periodically changes its tuning from one broadcasting station to another broadcasting station. However, only a currently broadcasting individual song can be presented to the user who is listening to their radio. When the radio shuffles (re-tunes) to a new broadcasting radio station, the radio can only present the currently broadcasting audio content that the radio is currently tuned to. Thus, it is likely that the currently broadcasted song has already started prior to the re-tuning to that broadcasting radio station such that the user can only listen to a concluding portion of the currently broadcasting song. Here, the user is unable to listen to the song in its entirety (since the initial portion of the song has already been broadcasted by the radio station).

Accordingly, there is a need in the arts to provide systems and methods of improved shuffling of audio content.

SUMMARY

Systems and methods of shuffling play of songs are disclosed. An exemplary embodiment concurrently receives, during a shuffle operation, a stream of audio content from each one of a plurality of predefined audio content sources, wherein each of the streams of audio content comprises a plurality of songs that are serially received at the media device. Each song is stored in a memory medium of the media device as the song is received. A first predefined audio content source is selected from the plurality of predefined audio content sources. Then, a first song is selected having at least a beginning portion that is stored in the memory medium and that was provided by the selected first predefined audio content source. A second predefined audio content source is selected from the plurality of predefined audio content sources that is to provide a second song that is to be presented to the user upon conclusion of the presentation of the first song.

BRIEF DESCRIPTION OF THE DRAWINGS

Preferred and alternative embodiments are described in detail below with reference to the following drawings:

FIG. 5 is a diagram conceptually indicating content stored in the pointer table.

DETAILED DESCRIPTION

Figure 1:
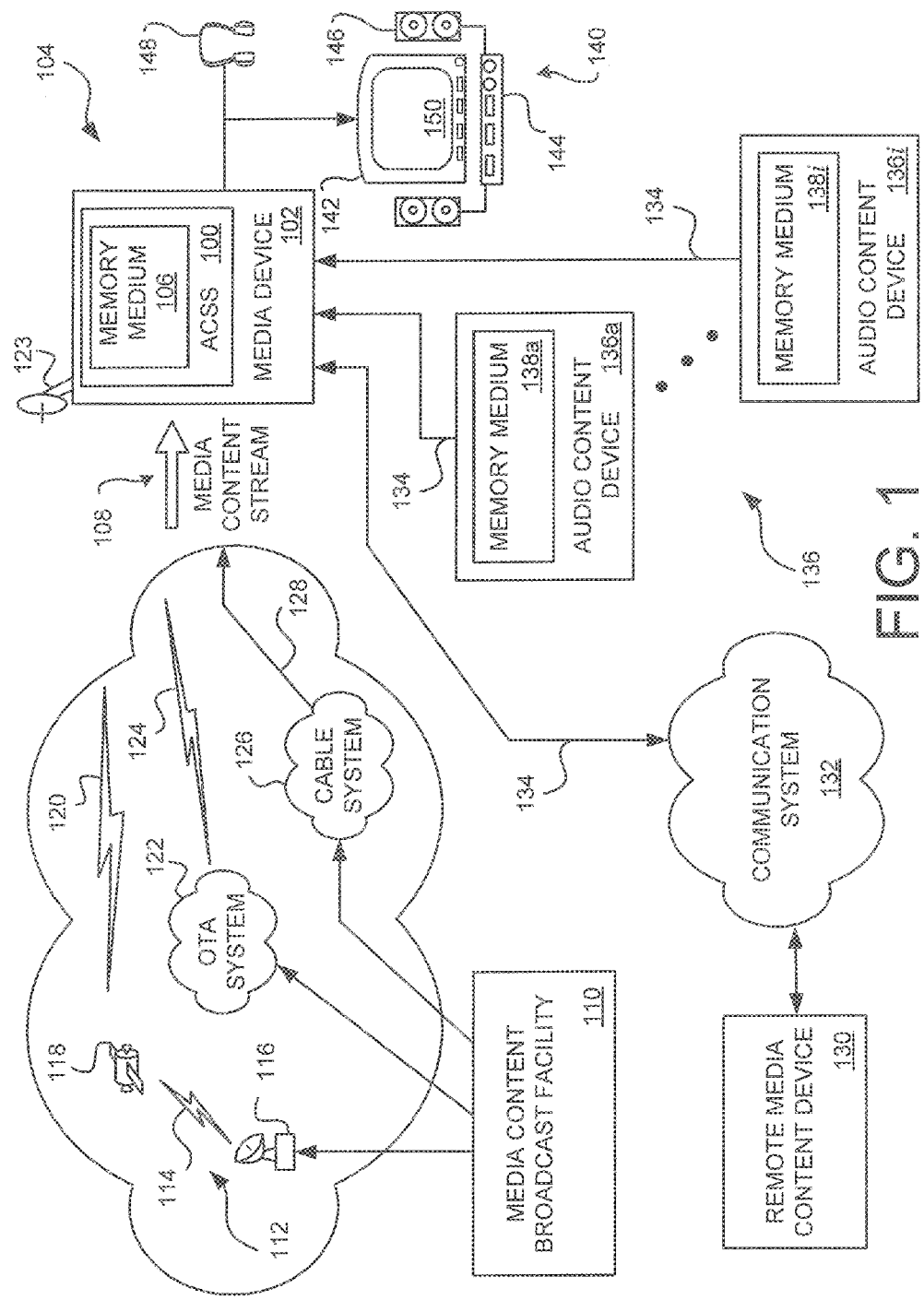
FIG. 1 is a block diagram of an embodiment of an audio content shuffle system implemented in a media device operating in a media content delivery environment.

FIG. 1 is a block diagram of an embodiment of an audio content shuffle system 100 implemented in a media device 102, such as, but not limited to, a set top box (STB), operating in a media content delivery environment 104. Embodiments of the audio content shuffle system (ACSS) 100 may be implemented in other media devices, such as, but not limited to, a stereo, a surround-sound receiver, a radio, a television (TV), a digital video disc (DVD) player, a digital video recorder (DVR), a compact disc (CD) player, a cell phone, a smart phone, a note pad, a game playing device, or a personal computer (PC) that is configured to receive audio content.

Embodiments of the audio content shuffle system 100 are configured to shuffle songs presented by the media device 102. The songs are received in a plurality of audio content streams that are concurrently received at the media device 102 during a shuffle operation. A "shuffle" is defined as a change from first audio content (received from a first audio content source and/or received in a first audio content stream) to second audio content (received from by a second audio content source and/or received in a second audio content stream). That is, the media device 102 "shuffles" from first song received from a first audio content source to second song received from a second audio content source (that is different from the first audio content source).

Preferably, the shuffling occurs at a conclusion of a currently presented song (interchangeably referred to herein as a "shuffled-from song") received from the first predefined audio content source, such that presentation then proceeds (continues) with a beginning of a next song (interchangeably referred to herein as a "shuffled-to song") received from the second predefined audio content source. In contrast with prior art shuffling in a broadcast environment, the entirety of the shuffled-to song is presented by the media device 102 to the user because the initial portion of the shuffled-to song has been saved at the media device 102.

For example, in a broadcast environment, the predefined audio content sources may be broadcasting stations, such as a radio station or other song-based broadcasting source. During a shuffling operation, the media device 102 (with multiple tuners) currently tunes to at least a first broadcasting station and a second broadcasting station such that received songs are saved at the media device 102. After the conclusion of the presentation of a currently presented song, the next shuffled-to song is presented in its entirety to a user.

The plurality of audio content streams may be provided to the media device 102 from a variety of different types of audio content sources. In some situations, the media device 102 may be receiving a broadcast of a series of songs from a broadcasting audio content source while concurrently receiving a series of songs from a non-broadcasting audio content source that is communicatively coupled to the media device 102. Non-limiting examples of a non-broadcasting audio content source include, but are not limited to, a record player, a CD player, a DVD player, a cassette tape player, a website, a memory medium, or the like.

As a series of songs are being received by the media device 102, each of the received songs received from the plurality of audio content sources are stored in a memory medium 106 residing in or communicatively coupled to the media device 102. Individual songs in the received audio content streams are identifiable by at least their beginning (interchangeably referred to herein as the start of the song), their conclusion (interchangeably referred to herein as the end of the song), and the audio content source that provided the song to the media device 102.

During operation, a song that is received in a currently selected one of the audio content sources is presented to the user. At the conclusion of the song, the audio content shuffle system 100 changes (shuffles) to another one of the plurality of audio content sources. Since the next song received in the shuffled-to audio content stream has been stored in the memory medium 106, embodiments of the audio content shuffle system 100 access the next song at its beginning. The entirety of the next song is then presented to the user.

Upon the conclusion of the presentation of that next song, another shuffling occurs to another one of the audio content sources. A song received in the next shuffled-to audio content source is being saved, or has already been saved, into the memory medium 106. Accordingly, this next shuffled-to song may be presented in its entirety when this song is accessed at its beginning from the memory medium 106.

The example media content delivery environment 104 provides (communicates) the plurality of media content streams 108 (interchangeably referred to as an audio content stream 108 when video content is absent) to the media device 102 from a variety of different audio content sources. For example, but not limited to, one or more media content streams 108 may be broadcast from a media content broadcast facility 110 to the media device 102. In an example environment, a single received media content stream 108 may have a plurality of streams of audio content (comprising a series of songs) interleaved together in the media content stream 108. Here, the media device 102 tunes to the particular media content stream 108 providing audio content from a specified audio content source, and then processes the media content stream 108 to access the series of songs provided by the specified audio content source, Some media content streams 108 have only a single stream of audio content therein. A non-limiting example of a media content stream 108 with a single audio content stream is a RF broadcast from a radio station that is broadcasting a radio program. Other examples of audio content sources providing a single steam of audio content include, but are not limited to, a record player, a CD player, a DVD player, a cassette tape player, a website, a memory medium, or the like.

Other media content streams 108 may be comprised of a plurality of audio content streams and video/audio content streams. An example of a media content stream with a plurality of audio content streams and/or video/audio content streams may be referred to as a transport channel that is communicated from a satellite down to a plurality of receiving media devices 102.

As noted herein, a media content stream 108 may include one or more content streams that have both video and audio content. Here, an exemplary media content stream 108 comprises a series of media content events that each have a video component and an audio component. For example, but not limited to, a particular "channel" may be broadcasting a movie. The movie is defined by a series of video scenes that present thematic content (a story) on a display device. The audio component of the movie may include dialogue spoken between actors, and from time to time, one or more songs. Embodiments of the audio content shuffle system 100 discern the individual songs received in the movie, and store the identified songs in the memory medium 106.

As another example, the media content event may be a music video that presents video content and a single associated song. Embodiments of the audio content shuffle system 100 discern the individual songs received in the music video, and store the identified songs in the memory medium 106. Additionally, some embodiments may also store the video component of the music video such that when the song is presented in a shuffle operation, the video content associated with the presented song is also presented on the display 150.

A variety of types of audio content delivery systems may be used for the broadcast of the media content stream 108 to the media devices 102. An example portion of the audio content delivery system may employ a satellite system 112 wherein an uplink signal 114 is communicated from a ground antenna 116 up to one or more satellites 118. Each of the exemplary satellites 118 broadcast a wireless satellite signal 120 (which may be referred to as a transport channel) down to a receiver antenna 123 that is coupled to the media device 102.

Alternatively, or additionally, an example portion of the audio content delivery system may employ an over the air (OTA) system 122 wherein an OTA wireless signal 124 is communicated over the air. The wireless signal 124 is received by the receiver antenna 123.

Alternatively, or additionally, an example portion of the audio content delivery system may employ a cable system 126 wherein a wire-based signal is communicated using a suitable cable 128 or the like that is coupled to the media device 102. Non-limiting examples of the cable 128 include a fiber optic cable, a coaxial cable, a high definition multi-media interface (HDMI) cable, and a telephone line.

The media content stream 108 may also be received by the media device 102 in other manners. In an exemplary embodiment, a remote media content device 130, such as an Internet site or the like, may provide the media content stream 108 to the media device 102 over an intervening communication system 132 via an established communication link 134. The communication link 134 may be a wire-based communication link wherein a wire connector, cable or the like communicatively coupled the media device 102 to the intervening communication system 132. Alternatively, or additionally, the communication link 132 may be a wireless link, such as employed by a Wi-Fi system, a cellular phone system, or the like.

Alternatively, or additionally, the media device 102 may be communicatively coupled to one or more an audio content devices 136. Non-limiting examples of an external content device include, but are not limited to, a portable memory medium, a DVD player, a CD player, a record player, a video cassette recorder, or the like. These types of audio content devices 136 access stored and/or received audio content (and/or audio/video content) residing in a memory medium 138. For example, the audio content device 136*a* may be a CD player that is accessing songs from a CD, here the example memory medium 138*a*. As another non-limiting example, the audio content device 136*i* may be a record player that is accessing songs from a vinyl record, here the memory medium 138*i*.

In some situations, the audio content device 136 may be receiving a broadcasted audio content stream. For example, the audio content device 136 may be a radio tuner or the like that is communicatively coupled to the media device 102. Here, the radio receives the OTA wireless signal 124, and then communicates the audio content to the media device 102 in the media content stream 108.

The exemplary media device 102 is communicatively coupled to a media presentation system 140 that includes a visual display device 142, such as a television (hereafter, generically a TV), and an audio presentation device 144, such as a surround sound receiver, that outputs the audio content on one or more speakers 146 (and/or a headphone 148 worn by the user). Other types of output devices may also be coupled to the media device 102, including those providing any sort of stimuli sensible by a human being, such as temperature, vibration and the like.

The video portion of the streamed content, if present, is displayed on the TV display 150. The audio portion of the streamed content is reproduced as sounds by one or more TV speakers (not shown). The volume output of the audio portion may be controllable at the TV 142, at the audio presentation device 144, and/or at the media device 102.

Figure 2:
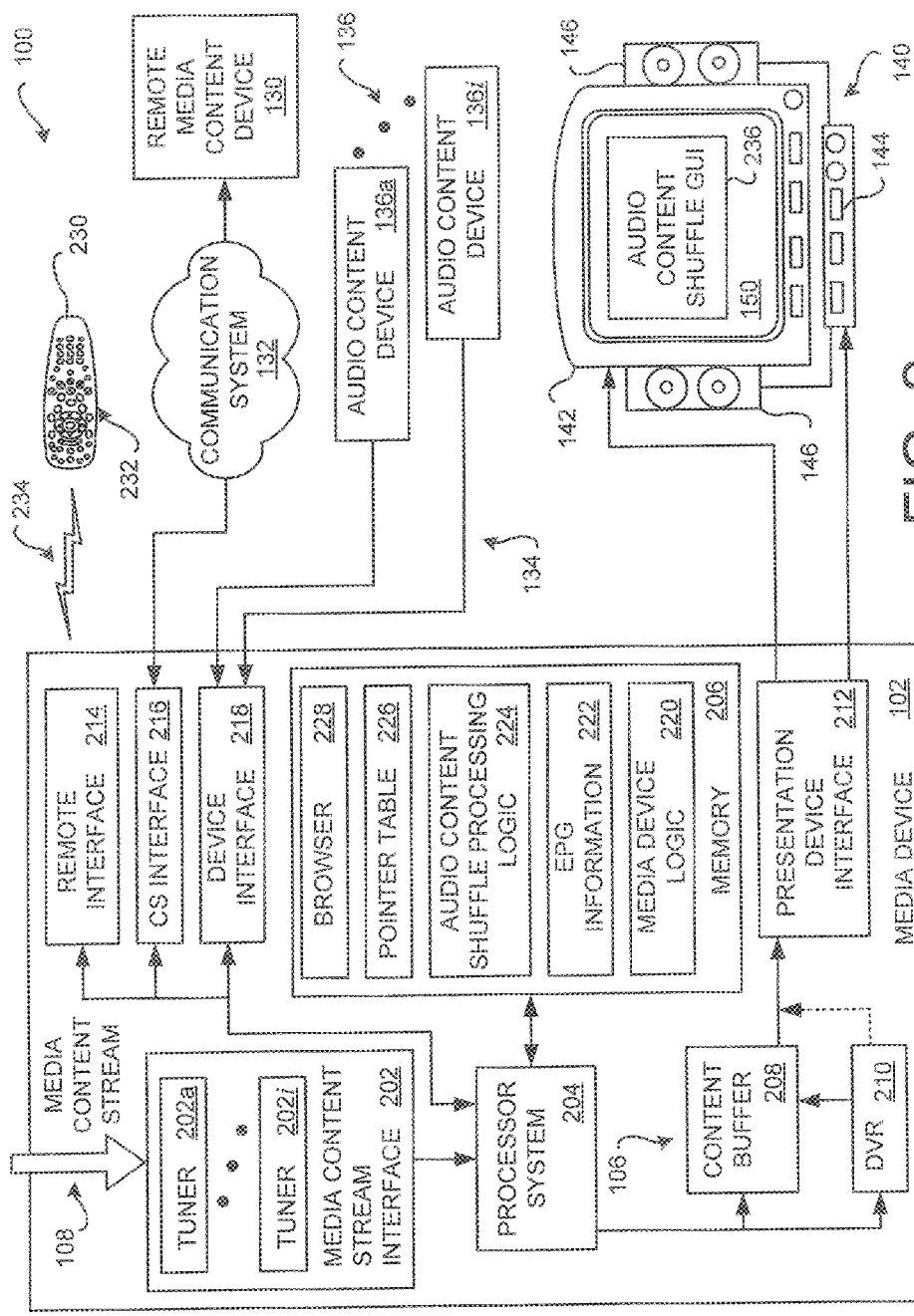
FIG. 2 is a block diagram of an embodiment of the audio content shuffle system implemented in an example set top box (STB)

FIG. 2 is a block diagram of an embodiment of an audio content shuffle system 100 implemented in an example set top box (STB). The non-limiting exemplary media device 102 comprises a media content stream interface 202, a processor system 204, a memory 206, a content buffer 208, an optional digital video recorder (DVR) 210, a presentation device interface 212, a remote interface 214, an optional communication system (CS) interface 216, and an optional device interface 218. The memory 206 comprises portions for storing the media device logic 220, the electronic program guide (EPG) information 222, the audio content shuffle processing logic 224, pointer table 226, and an optional browser 228. In some embodiments, the media device logic 220 and the audio content shuffle processing logic 224 may be integrated together, and/or may be integrated with other logic. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments.

The functionality of the media device 102, here a set top box, is now broadly described. When operating in a broadcast type environment, a media content provider provides media content that is received in one or more multiple media content streams 108 multiplexed together in one or more transport channels. The transport channels with the media content streams 108 are communicated to the media device 102 from a media system or device.

For example, in a broadcast-based environment, the media content (which inherently includes audio content) is sourced from the media content broadcast facility 110 (FIG. 1) operated by a media content provider. Non-limiting examples of such media delivery systems operating in a broadcast environment include satellite systems, cable system, and the Internet. For example, if the media content provider provides programming via a satellite-based communication system 112, the media device 102 is configured to receive one or more broadcasted satellite signals 120 detected by the receiver antenna 123. Alternatively, or additionally, the media content stream 108 can be separately and/or concurrently received from one or more different sources, such as, but not limited to, a cable system, a radio frequency (RF) communication system, or the Internet.

The one or more broadcasted media content streams 108 are received by the media content stream interface 202. In the broadcast environment, one or more tuners 202*a*, 202*i* in the media content stream interface 202 selectively tune to one of the media content streams 108 in accordance with instructions received from the processor system 204. The processor system 204, executing the media device logic 220 and based upon a request for a media content event of interest specified by a user, parses out media content associated with the media content event of interest. When the audio content shuffle system 100 is operational to shuffle presentation of audio content, the media content events of interest are appreciated to be individual songs.

The media content event of interest, here songs during presentation of audio content, is then assembled into a stream of audio information (and/or video information if present, as in the case of music videos, movies or the like) which may be stored by the content buffer 208 such that the media content can be streamed out to components of the media presentation system 140, such as the visual display device 142 and/or the audio presentation device 144, via the presentation device interface 212. Alternatively, or additionally, the parsed out media content may be saved into the DVR 210 for later presentation. The DVR 210 may be directly provided in, locally connected to, or remotely connected to, the media device 102.

From time to time, information populating the EPG information 222 portion of the memory 206 is communicated to the media device 102, via the media content stream 108 or via another suitable media. The EPG information 222 stores information pertaining to the scheduled programming of media content events. The information may include, but is not limited to, a scheduled presentation start and/or end time, a program channel, and descriptive information. In the case of audio content, the descriptive information may describe the nature of the audio content (classic rock, country, show tunes, operas, etc.). The media content event's descriptive information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 222 is retrieved, formatted, and then presented on the display 150 as an EPG.

The exemplary media device 102 is configured to receive commands from a user via a remote control 230. The remote control 230 includes one or more controllers 232 disposed on the surface of the remote control 230. The user, by actuating one or more of the controllers 232, causes the remote control 230 to generate and transmit commands, via a wireless signal 234, to the media device 102. The commands control the media device 102 and/or control the media presentation system 140 devices. The wireless signal 234 may be an infrared (IR) signal or a radio frequency (RF) signal that is detectable by the remote interface 214.

As noted above, a user (not shown) may view and listen to various audio/video content when presented on the exemplary television 142 and/or the exemplary surround sound receiver 144. That is, based upon the user commands, typically generated at and transmitted from the remote control 230 in the wireless signal 234 that is received by the remote interface 214, the media device 102 can then control itself and/or the other various media devices that it is communicatively coupled to. Accordingly, available media content, such as a series of songs, is presented in accordance with the generated user commands.

The processes performed by the media device 102 relating to the processing of the received media content stream 108 and communication of a presentable media content event to the components of the media presentation system 140 are generally implemented by the processor system 204 while executing the media device logic 220. Thus, the media device 102 may perform a variety of functions related to the processing and presentation of one or more media content events (such as, but not limited to, a series of songs) received in the media content stream 108.

The processes performed by the media device 102 relating to the shuffling and presentation of songs are generally implemented by the processor system 204 while executing the audio content shuffle processing logic 224. Thus, the media device 102 may perform a variety of functions related to the shuffling a series of songs received in the media content stream 108 or received from the audio content devices 136.

In the various embodiments, the audio content shuffle system 100 shuffles presentation of songs that have been, or are being provided by, a plurality of predefined audio content sources that have been designated by the user. That is, the user predefines, specifies or otherwise selects a plurality of audio content sources prior to a shuffle operation. Identifiers of the predefined plurality of audio content sources are saved in a suitable location in the memory 206, such as in the pointer table 226, or in another suitable memory medium. In operation, a series of shuffled songs may then be presented to the user in accordance with those identified predefined audio content sources.

When the predefined audio content sources are providing a broadcasted stream of audio content (or a stream of video/audio content), unique identifier information that uniquely identifies each of the predefined audio content sources is stored in the pointer table 226 or in another suitable memory medium or memory location. Accordingly, a listing of a plurality of audio content sources is predefined by the user. Example identifier information for broadcasting types of predefined audio content sources may include, but are not limited to, a channel number or a station call sign.

The identifier information of the broadcasting audio content sources, when the media device 102 is receiving a particular stream of audio content (or a stream of video/audio content) from the media content broadcast facility 110 (FIG. 1), includes information so that the processor system 204, based on the identifier information, provides control instructions to one of the tuners 202a-i to cause the designated tuner to tune to the particular media content stream 108 that is associated with the identified audio content source. Accordingly, the series of songs received from that particular "tuned-to" broadcasting audio content source are saved into the content buffer 208, the memory medium 106, or the like in an example embodiment as the series of songs are received at the media content stream interface 202.

In embodiments of the media device 102 that have a plurality of tuners 202a-i, a plurality of different broadcasting predefined audio content sources may be specified by the user. Accordingly, the processor system 204 provides control instructions to different ones of the plurality of tuners 202a-i to cause each of the designated tuners to tune to the particular media content stream 108 that is associated with one of the identified audio content sources. As each of the broadcasted songs are received at a particular one of the tuners 202a-i, the songs are saved into the content buffer 208, the memory medium 106, or the like. In some embodiments, associated video content may be also saved into the content buffer 208, the memory medium 106, or the like along with the received songs.

In some situations, a single tuner 202 may receive audio content streams from multiple audio content sources. Here, the processor system 204 simply parses out the songs from the media content stream 108 that are being provided by the predefined ones of the audio content sources that are broadcasting within the same media content stream 108. Accordingly, single-tuner media devices can shuffle between different broadcasted audio streams so long as they are all commonly received in a single media content stream 108. Media devices 102 with multiple tuners 202a-i may shuffle between a greater number of broadcasting audio content sources.

Some media devices 102 are provisioned with a virtual tuner. Accordingly, such media devices 102 can receive songs from a plurality of broadcasting predefined audio content sources.

In some situations, one or more of the predefined audio content sources may be located at one or more of the remote media content devices 130. An exemplary remote media content device 130 may be a web site that provides audio content. Here, the identifying information of a remote media content device 130 includes information that permits the media device 102 to establish a link 134, using its respective CS interface 216 and via the communication system 132, to the designated (predefined) remote media content device 130. For example, the identifying information may include a web site address, a hypertext transfer protocol (http) identifier, or the like. The processor system 204 may then use the identifying information to establish the link 134 to the predefined remote media content device 130.

Once the link 134 has been established between the media device 102 and the predefined remote media content device 130, a stream of audio content may be received from that particular remote media content device 130. For example, but not limited to, the remote media content device 130 may be operable to provide a stream of country songs to the media device 102. As each of the country songs are received from the remote media content device 130, the songs are saved into the content buffer 208, the memory medium 106, or the like. In some embodiments, associated video content may be also saved into the content buffer 208, the memory medium 106, or the like along with the received songs.

In some situations, multiple streams of audio content may be available from a single remote media content device 130. For example, the remote media content device 130 may be configured to provide one or more themed streams of rock and roll music, streams of country music, etc. Accordingly, the user may specify and/or request multiple streams of audio content from the remote media content device 130 which may be received over the established communication link 134. As each of the individual songs are received from the remote media content device 130, the songs are saved into the content buffer 208, the memory medium 106, or the like, and are associated with an identifier that identifies the requested stream of themed music and the remote media content device 130. In some embodiments, associated video content may be also saved into the content buffer 208, the memory medium 106, or the like along with the received songs.

In some embodiments, the processor system 204, executing the browser 228, may use descriptive information provided by the user to identify location information of the remote media content device 130 and then establish the communication link 134 to that particular remote media content device 130. For example, the user may specify a common name or the like associated with a remote media content device 130 of interest. A suitable search engine of the browser 228 may then be used to identify the remote media content device 130 of interest and then establish a communication link 134 thereto. The descriptive information provided by the user may also be used to identify a particular stream of audio content of interest that the user is interested in receiving from that particular remote media content device 130.

For example, the user might generally specify that the media device 102 should log into the website of "Company ABC" and want to access its country music channel. Then, the processor system 204, using the browser 228, would obtain access information for the website associated with "Company ABC" and then establish the link 134 between the media device 102 and the "Company ABC" remote media content device 130. Then, the processor system 204 can explore and discover the requested "country music channel" that is available at the linked-to remote media content device 130. Streaming audio content could then be received by the media device 102 from "Company ABC" for the requested country music.

In some embodiments, web pages of the like are presented to the user on the display 150 when the user is operating their media device 102 to access a particular remote media content device 130. Thus, the user may enter in search criteria, select a particular web page of interest, navigate through one or more subsequently presented web pages, to arrive a web page that permits selection of a particular audio content stream of interest (such as the above described "Company ABC" country music channel.) The user may then actuate one or more of the controllers 232 of the remote control 230, or another suitable input device, to select that particular remote media content device 130 and/or the particular audio content stream of interest provided by the remote media content device 130.

In other situations, one or more audio content devices 136 may alternatively, or additionally, provide a stream of audio content (a stream of songs) to the media device 102. Here, the device interface 218 is used to communicatively couple one or more of the audio content devices 136 to the media device 102. A wire-based connector, such as a fiber optic cable, a coaxial cable, a HDMI cable, or other suitable wire connectors may be used for the link 134 between the media device 102 and a particular audio content device 136. Each of the audio content devices 136 are identifiable with a unique identifier that is stored in the pointer table 226 or in another suitable memory medium or memory location.

For example, the audio content device 136 might be a record player, a CD player, a DVD player, a cassette tape player, or the like that accesses a series of songs from a memory medium. As each of the individual songs are received, via the link 134, from the operating audio content device 136, the received songs are saved into the content buffer 208, the memory medium 106, or the like The saved songs are associated with an audio content device identifier that uniquely identifies that particular audio content device 136 that provided the song. In some embodiments, associated video content may be also saved into the content buffer 208, the memory medium 106, or the like along with the received songs.

Alternatively, or additionally, the device interface 218 may be configured to receive wireless signals from one or more of the remote media content devices 130. For example, the user may configure a portable electronic device to output a stream of songs. The media device 102 would then receive the wirelessly communicated stream of audio content and save individual songs into the content buffer 208, the memory medium 106, or the like.

In practice, the user specifies (predefines) a plurality of different audio content sources prior to shuffle play operation. In an example embodiment, a list of the predefined audio content sources is stored based on user input. In some embodiments, an audio content shuffle graphical user interface (GUI) 236 may be presented to the user on the display 150 or on another suitable visual display device. For example, the audio content shuffle GUI 236 could be presented on the display of a smart phone, lap top computer, note pad or the like. The user is then able to specify (predefine) one or more audio content sources using the audio content shuffle GUI 236.

Figure 3:
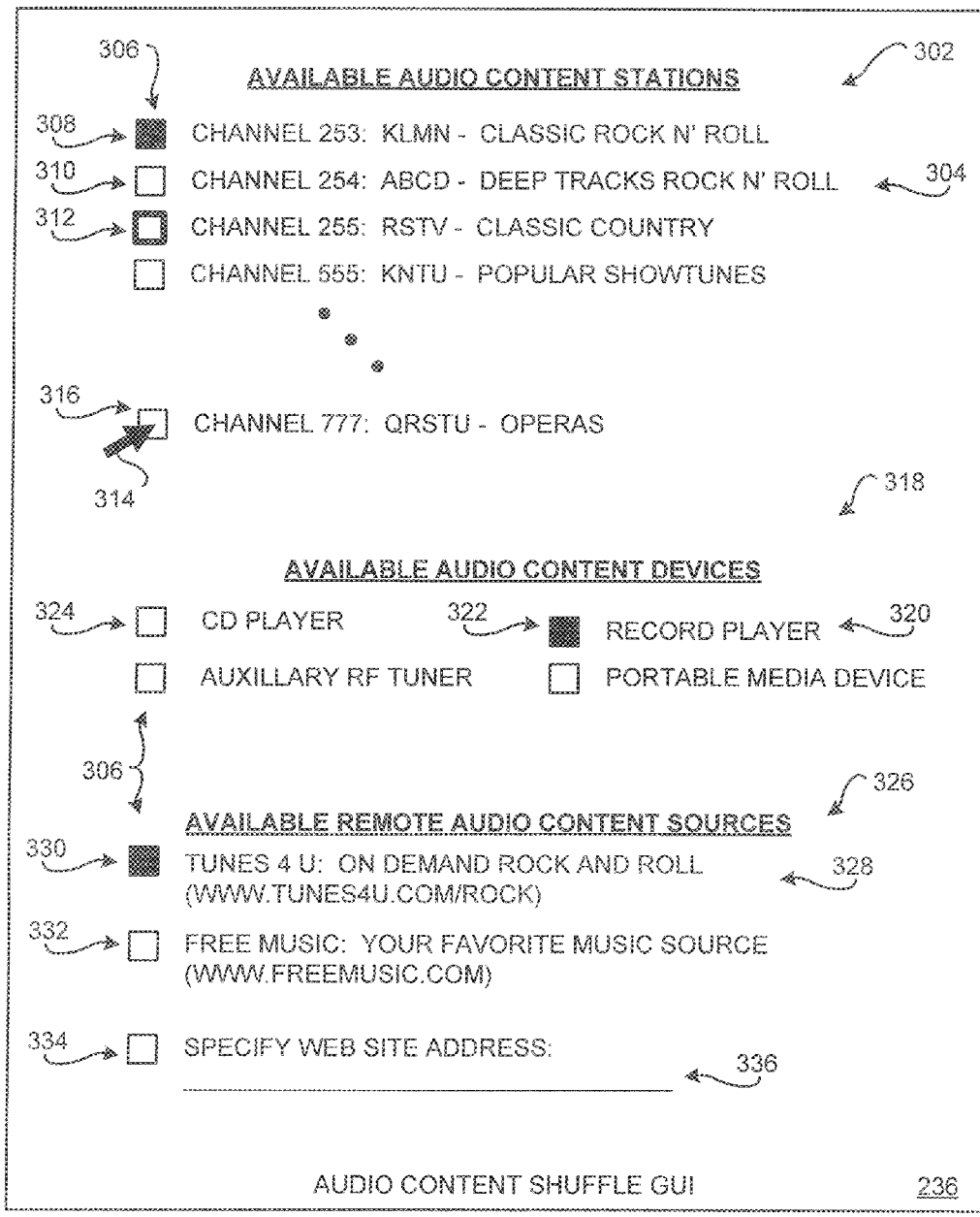
FIG. 3 is a conceptual illustration of an embodiment of an audio content shuffle GUI.

FIG. 3 is a conceptual illustration of an embodiment of the audio content shuffle GUI 236. The exemplary audio content shuffle GUI 236 is configured to be presented on the display 150. Other audio content shuffle GUIs 236 may be configured for presentation on other types of visual display devices and/or portable electronic devices having a display 150 thereon.

The audio content shuffle GUI 236 is a type of a user interface that presents a menu, or a series of menus, that indicate selectable audio content sources that may be selected by the user to provide audio content during shuffle operation. The audio content shuffle GUI 236 has the look and feel of a table that uses a combination of text and/or symbols to indicate the selection choices that may be made, or that have been previously made, by the user to predefine the audio content sources that are to provide songs during shuffle operation. The user, by actuating one or more of the controllers 232 on the remote control 230 (FIG. 2), is able to "scroll" or "navigate" about the audio content shuffle GUI 236 to select one or more audio content sources of interest.

Here, the exemplary audio content shuffle GUI 236 has a first region 302 that lists various broadcasting type audio content sources, referred to as stations, that are broadcasting audio content that the media device 102 might receive. Some media devices identify such stations using an assigned channel number and/or station call signs. For each available audio content source, unique identifying information 304 and a corresponding selectable region 306 for each of the stations are indicated on the presented audio content shuffle GUI 236.

The identifying information for each station intuitively informs the user about the characteristics of each listed audio content source. For example, in a broadcast environment, channel identifiers may be indicated. Thus, the user intuitively understands which channel of audio content they might select based on the identified channel number.

Additionally, or alternatively, a station's call sign may be also included in the identifying information 304. Here, the user likely intuitively understands some particular aspect of the associated audio content source when they see the station's call sign. A call sign is an abbreviated identifier that has been registered with and/or has been assigned by the Federal Communications Commission (FCC). Further, the identifying information 304 may provide textual information describing characteristics of the type of songs available from that particular audio content source.

To illustrate, the first listed audio content source is identified as "Channel 253: KLMN—Classic Rock N' Roll" in the example audio content shuffle GUI 236. Here, the user appreciates that if they were using their media device 102 to currently access audio content for immediate presentation, that particular audio content source would be found at station 253. Here, the user may already be familiar with station KLMN, and thus appreciate that that particular audio content source will be providing songs that the user would like to listen to. Alternatively, or additionally, the user may be interested in rock and roll type music, and thus be informed that station KLMN on channel 253 is providing that type of audio content.

Selection of particular audio content sources may be made by the user by navigating to and then selecting that associated selectable region 306 using controllers 232 on the remote control 230, or by using another suitable input device. Further, the selectable regions 306 may indicate whether a particular one of the audio content sources has been previously selected as currently being one of the predefined audio content sources that will be providing songs for the shuffling process. For example, the selectable region 308 is shown with black shading to indicate that that particular audio content source has already been selected by the user for inclusion as one of the currently active predefined audio content sources that will be accessed to provide songs during a shuffle operation. In contrast, the selectable region 310, shown with white shading, indicates that the audio content source (identified as "Channel 254: ABCD—Deep Tracks Rock N' Roll") is not currently selected as one of the predefined audio content sources. Thus, upon initiation of the shuffle operation, songs from that station will not be used to provide songs for shuffling.

To further conceptually illustrate operation of an exemplary audio content shuffle GUI 236, the selectable region 312 is highlighted (shown as a dark border line) to indicate that this particular selectable region 312 is active. For example, the user may have navigated to that selectable region 312. Thus, if the user then actuates one or more of the controllers 232 on the remote control 230, or another suitable input device, then that associated audio content source (identified as "Channel 255: RSTV—Classic Country") will then become selected as one of the predefined audio content sources that will provide songs for shuffling. That is, a user generated add selection causes the processor system 204 to add the selected audio content source as a new member of the plurality of predefined audio content sources that will be used in the subsequent shuffle operation. Conversely, had the selectable region already been selected (black shaded), a user generated remove selection would cause the processor system 204 to remove the selected audio content source as a member of the plurality of predefined audio content sources that will be used in the subsequent shuffle operation.

Some media devices 102 may not be controllable by a remote control 230. For example, the media device 102 may be a laptop computer, smart phone, note pad or the like. Such devices may be configured to enable navigation about the audio content shuffle GUI 236 by the user with a moveable icon 314 (represent able as a pointer, an arrow, glove/hand, or other suitable icon). Here, the user has moved the icon 314 to hover over the selectable region 316. Thus, if the icon 314 is actuated, the audio content source associated with the selectable region 316 will then become selected as one of the predefined audio content sources that will provide songs for shuffling.

In practice, during shuffle operation, the processor system 204 tunes one of the tuners 202a-i to receive the media content stream 108 that is associated with that particular channel number and/or call sign that have been predefined by the user. Here, identifier information associated with the selected broadcasting type audio content sources is stored in the pointer table 226 or in another suitable memory medium or memory location. The identifier information enables the processor system 204 to operate the tuners 202a-i.

Information used to generate the audio content shuffle GUI 236 may be stored in the pointer table 226 (or in another suitable memory medium or memory location of the memory 206). Thus, a listing of the broadcasting-type audio content sources can be generated for inclusion on a presented audio content shuffle GUI 236. The identifying information for the plurality of audio content sources may be obtained in a variety of manners.

In an example embodiments, prior selections made by the user are used to generate the listed audio content sources indicated on the presented audio content shuffle GUI 236. Thus, a running list of previously selected audio content sources may be maintained. Further, previously selected audio content sources may be indicated as being, or not being, currently selected based on their status used during the precious shuffle operation. In some embodiments, the user is able to remove or delete a particular audio content source from the list of prior-selected audio content sources.

In some embodiments, the media device 102 may include a learning function (such as a neural network or the like) that is configured to monitor prior user behavior, such as selection of particular broadcasting-type audio content sources that the user has previously selected for listening. For example, if the user has selected a particular audio content source to listen to more than some predefined threshold number of times and/or within some predefined threshold of time, that particular audio content source may then be added to the list of audio content sources presented on the audio content shuffle GUI 236.

Alternatively, or additionally, the user might be viewing an EPG (not shown). A particular audio content source of interest listed on a presented EPG may be selected by the user for inclusion on the listing of audio content sources. For example, selection could be made for a highlighted identifier indicated on the presented EPG that is associated with a particular audio content source in response to the user's actuation of one or more of the controllers 232 on the remote control 230, or by using another suitable input device. Accordingly, that particular audio content source may then be added to the list of audio content sources that will be presented on the audio content shuffle GUI 236.

Alternatively, or additionally, the media device 102 may be configured to receive audio content from one or more audio content devices 136 that are, or that may be, communicatively coupled to the media device 102. A textual descriptor 320 intuitively informs the user which particular audio content devices 136 are available. For example, the textual descriptors 320 on the exemplary audio content shuffle GUI 236 indicate that audio content may be available from a CD player, a record player, an auxiliary RF tuner, and a portable media device.

In an example embodiment, audio content devices 136 that are currently available to provide audio content to the media device 102 are indicated in the region 318 of the audio content shuffle GUI 236. The identifiers of these audio content devices 136 are stored in the pointer table 226, or in another suitable memory medium or memory location. In some embodiments, the stored predefined identifiers correspond to a plurality of available connection ports of the device interface 218. Alternatively, or additionally, the user may specify particular ones of the audio content devices 136 that are to be listed on a presented audio content shuffle GUI 236.

Alternatively, or additionally, the listing of audio content devices 136 shown in region 318 may be dynamically determined when presentation of the audio content shuffle GUI 236 is initiated. For example, HDMI compatible audio content devices 136 communicatively coupled to a HDMI compatible media device 102 may be discovered by the media device 102 since HDMI compatible devices broadcast their identifying information to other HDMI compatible devices.

Each of the listed available audio content devices 136 are associated with a corresponding selectable region 306. Here, the user is able to navigate about the presented audio content shuffle GUI 236 to select or deselect audio content devices 136. If selected, and if a stream of audio content is being currently received during shuffle operation, then songs received from that selected audio content device 136 is stored into the content buffer 208, the memory medium 106, or the like. Available identified audio content devices 136 may be selected or deselected in any suitable manner.

For example, the black-shaded selectable region 322 shown on the audio content shuffle GUI 236 conceptually indicates that audio content received from the record player has been selected as one of the predefined audio content sources that will provide songs for shuffling. Conversely, the white-shaded selectable region 324 indicates that the CD player has is not currently selected as one of the predefined audio content sources. Here, if the record player is playing a record, songs received from the record player are presented during shuffle operation. Even if the CD is operating (playing a CD), songs received from the CD player are not presented during shuffle operation since the CD player has not been selected.

As another example, the user may navigate to and select the selectable region associated with the portable media device. Here, the use may have predefined their cellular phone, smart phone, lap top, note pad or other device as being the portable media device. If selected by the user, songs stored on the memory medium of the portable media device will be received at the media device 102, stored, and then played during a shuffle operation. Alternatively, or additionally, that portable media device may be used to access songs from other remote media content devices 130.

Selected audio content sources may include songs received at the media device 102 from one or more remote media content devices 130. A presented audio content shuffle GUI 236 may include a region 326 that indicates to the user selected (predefined) and/or available remote media content devices 130 that may provide songs for presentation during shuffle operation. Unique identifier information 328 intuitively informs the user about which particular remote media content devices 130 have been selected or are available for selection. A corresponding selectable region 306 are indicated on the presented audio content shuffle GUI 236 for each indicated remote media content device 130.

For example, the text "Tunes 4 U: On demand rock and roll (www.tunes4u.com/rock)" indicates to the user that the web site (an exemplary remote media content device 130) has been selected for providing songs that will be presented during shuffle operation (since the corresponding selectable region 330 is shown with dark shading). For example, this particular predefined audio content source indicated on the content shuffle GUI 236 indicates that this one of the plurality of predefined audio content sources is associated with a previous shuffle operation.

Further, the identifier information 328 informs the user that the songs may be expected to be rock and roll type songs. Further, the user appreciates that the media device 102 will establish a link 134 to the website www.tunes4u.com when shuffle operation is initiated. (Alternatively, in some embodiments, the link 134 to the website www.tunes4u.com may already be established prior to initiation of a shuffle operation.)

Conversely, the user appreciates that songs will not be received from the "Free Music" website (a selectable remote media content device 130) since the selectable region 332 is shown with a white shading. If the user wishes to receive songs from that particular website during shuffle operation, the user may navigate to and then select the selectable region 332 (as described herein for selection or de-selection of other selectable regions 306).

In the various embodiments, a list of remote media content devices 130 may be defined in a variety of manners. A remote media content device 130 may be identified in the audio content shuffle GUI 236 if the user has already selected and/or de-selected that particular remote media content device 130 for providing songs during previous shuffle operations.

Alternatively, or additionally, the user may operate the browser 228 (FIG. 2) to navigate to a remote media content device 130 of interest. While navigating to or about pages from that particular remote media content device 130, that remote media content device 130 may be selected or de-selected is response to the user actuating one or more of the controllers 232 on the remote control 230, or by using another suitable input device. Alternatively, or additionally, the browsing process may be performed at another electronic device, and information identifying the particular remote media content device 130 may then be communicated to the media device 102 for selection or de-selection of that remote media content device 130. For example, the user's cellular phone, smart phone, lap top or note pad may provide information to the media device 102.

Alternatively, or additionally, the media device 102 may include a learning function (such as a neural network or the like) that is configured to monitor prior user behavior, such as selection of particular remote media content devices 130 that the user has previously selected for listening. For example, if the user has selected a particular remote media content device 130 to listen to more than some predefined threshold number of times and/or within some predefined threshold of time, that particular remote media content device 130 may be added to the list of audio content sources presented on the audio content shuffle GUI 236.

Alternatively, or additionally, the learning process may be performed by another electronic device, and information identifying the particular remote media content device 130 may be communicated to the media device 102 for selection or de-selection of that remote media content device 130. For example, the user's cellular phone, smart phone, lap top, note pad or other device may provide the information about learned remote media content devices 130 to the media device 102.

Alternatively, or additionally, the region 326 may permit the user to specify a particular remote media content device 130 that will be used to provide songs during a shuffle operation. For example, the user may navigate to and select the selectable region 334 which enables the entry line 336. The user, using a suitable input device, may then enter alpha-numeric text to specify a particular remote media content device 130 of interest. For example, the user may enter the website address or the like of a particular remote media content device 130. When a shuffle operation is initiated, the media device 102 establishes a link 134 to the identified remote media content device 130. User input may be made using the remote control 230, a keyboard device (not shown) communicatively coupled to the media device 102, a virtual keyboard presented on the display 150, and/or another electronic device (such as, but not limited to, the user's cellular phone, smart phone, lap top or note pad). In some embodiments, the processor system 204 may be configured to access a particular website, using the browser 228, based on a more general input specifying a website of interest.

Summarizing, the audio content shuffle GUI 236 intuitively indicates to the user the identify of currently selected predefined audio content sources that will be used to provide songs during a shuffle operation. For example, as illustrated in the conceptual audio content shuffle GUI 236 of FIG. 3, the broadcast-type channel 253, the record player coupled to the media device 102, and the Tunes 4 U website will provide songs for presentation during a shuffle operation (since these predefined audio content sources are denoted by the black fill of their corresponding selectable region 306). During a shuffle operation, songs received from the broadcast-type channel 253, the record player, and the Tunes 4 U website are saved into the content buffer 208, the memory medium 106, or the like. When a song from one of those predefined audio content sources is presented (played), the initial portion of the song, or the entire portion of the song, is retrieved and presented.

The user exits when the user is finished selection of the plurality of predefined audio content sources using the content shuffle GUI 236, thus constituting the user specification of a plurality of predefined audio content sources. In some embodiments, presentation of shuffled songs may be initiated in response to exiting the content shuffle GUI 236.

An icon used to represent a selectable region 306 can be of fixed shape and/or size. Additionally, an icon can depict an arbitrarily shaped area with a distinctive pattern, color, and/or boundary. In some embodiments, the icon fill color, pattern, and/or brightness/intensity may be used to indicate whether the associated audio content source has been selected or de-selected.

In the various embodiments, during a shuffle operation, songs received from a plurality of predefined audio content sources are played to the user in a shuffling manner. In some embodiments, the order of song play shuffling may be ordered (predefined) such that songs shuffling between predefined audio content sources is repeated using the same order of predefined audio content sources. Alternatively, or additionally, the order of song shuffling may be random. Any suitable method or providing a random selection of songs for presenting may be used by the various embodiments.

Figure 4:
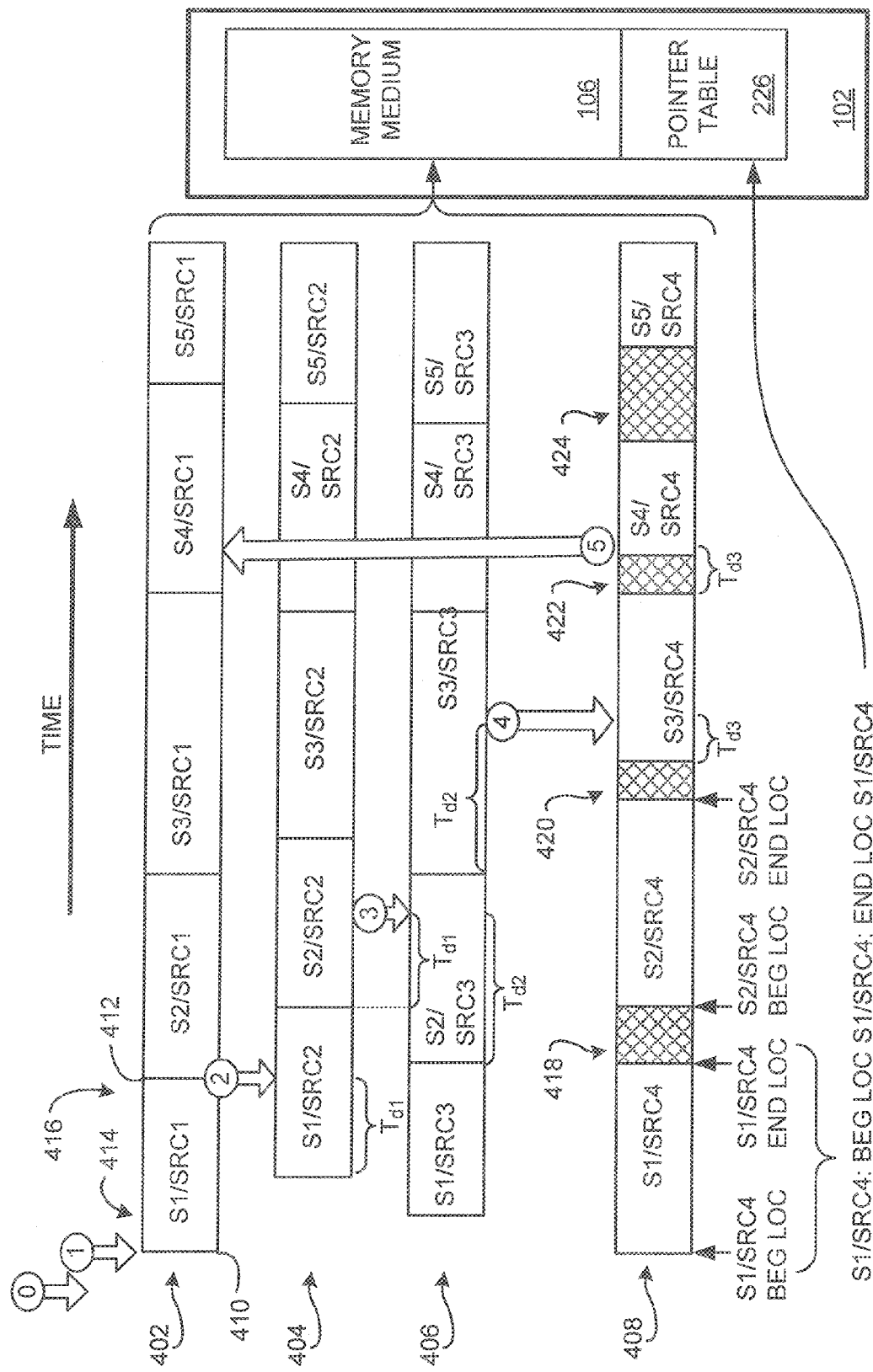
FIG. 4 is a diagram conceptually illustrating four audio content streams 402, 404, 406 and 408 received from four different predefined audio content sources.

FIG. 4 is a diagram conceptually illustrating four audio content streams 402, 404, 406 and 408 received from four different predefined audio content sources (not shown). Each of the audio content streams audio content streams 402, 404, 406 and 408 comprise a plurality of songs communicated serially in the audio content stream. The flow of received songs is referenced from the left side to the right side of FIG. 4.

For example, the audio content stream 402 conceptually illustrates that a first song (S1) has been received from a first predefined audio content source (SRC1). The first song S1/SRC1 has a beginning (indicated by reference numeral 410) and an end (indicated by reference numeral 412). Thus, the initial portion 414 of the first song S1/SRC1 is understood to be initially received at the media device 102 from the first predefined audio content source SRC1 and the concluding portion 416 of the first song S1/SRC1 is later received. This first song S1/SRC1 is stored into the memory medium 106 as it is being received at the media device 102.

The second song S2/SRC1 is next received at the media device 102 from the first predefined audio content source SRC1, and is saved into the memory medium 106. Similarly, the next songs S3/SRC1, S4/SRC1, and S5/SRC1 are received and stored. As illustrated, the series of received and stored songs received from the first predefined audio content source SRC1 (denoted by the identifiers S1/SCR1 through S5/SCR1) have little or no discernible gap, space, or the like between received songs. For example, such a stream of songs might be received from a playing record or CD.

Songs may have a variety of lengths of time (duration). For example, the first song S1/SRC1 received from the first predefined audio content source SRC1 has a shorter duration than the example first song S1/SRC2 received from the second predefined audio content source SRC2. Thus, the timing of the receipt of songs from the various predefined audio content sources 402, 404, 406 and 408 are not likely to be synchronized in time with each other.

The fourth predefined audio content source SRC4 illustrates that gaps or spaces in the audio content stream may separate the songs. For example, the intervening gap 418 separates the end of the first song (S1/SRC4) from the beginning of the second song (S2/SRC4). Similarly, the gaps 420, 422, 424 separate the songs S2/SRC4 and S3/SRC4, songs S3/SRC4 and S4/SRC4, and songs S4/SRC4 and S5/SRC4, respectively. These exemplary gaps may have the same duration or different durations.

Audio information may reside in one or more of these the gaps 418, 420, 422, 424. For example, if the fourth predefined audio content source SRC4 is a broadcasting radio station or the like, the gaps 418, 420, 422, 424 may comprise commercial content, commentary content, or the like. As another example, the fourth predefined audio content source SRC4 may be a broadcasting television station or the like that is broadcasting a movie, wherein scenes with dialogue between actors corresponds to the gaps 418, 420, 422, 424. Accordingly, the gaps 418, 420, 422, 424 may correspond those movie scenes that do not include a song or other musical content of interest.

Typically, individual songs received in a stream of audio content have identifiable beginning and ends. For example, songs broadcasted from a radio station include some form of meta data that may include the song title and/or the name of the performing artist (which is presentable on displays of a radio or the like). Such broadcast songs may include identifiers that indicate the start (beginning) and the conclusion (end) of each song. Thus, the beginning and end of each song is directly identifiable.

If such beginning and end information is not directly available in the received audio content stream, that embodiments may be configured to identify the beginning and end of a song based on a transition in the song information. For example, when song title information changes, the transition in that information infers the end of the current song and a beginning of the next song.

Additionally, or alternatively, the beginning and end may be identified by an analysis of the audio data itself. For sample, the processor system 204 may analyze the audio content and identify a period of silence (correspond to an absence of audio data in the received audio content stream), which may then be interpreted to correspond to the end of a current song and a beginning of a next song. If the gaps 418, 420, 422, 424 correspond to commercials or other audio commentary, information identifying the beginning and end of the commercials may be used to inferentially determine the beginning and end of songs. In the situation of a movie, individual songs are discerned, and then saved for playing during a shuffle operation.

In some situations, the audio content of one or more of the gaps 418, 420, 422, 424 may include a song or other musical content. To avoid saving and playing such undesirable audio content, other aspects of the audio content stream may be also considered. For example, the absence of a song title would tend to indicate that the currently received audio information is not a song that is to be stored and then played during a shuffle operation.

Embodiments are configured to use an appropriate analysis methodology for different types of predefined audio content sources. For example, the analysis method used to identify the beginning and end of songs in a broadcast stream having the example gaps 418, 420, 422, 424 will be different from the method used to identify the beginning and end of songs received from an audio content device 136 that is playing a record or CD. Accordingly, the audio content shuffle processing logic 224 includes the capability to identify the nature of the audio content streams provided from different predefined audio content sources, and then identify the beginning and end of songs based on characteristics associated with the audio content. Thus, if songs are received from a playing record and from a broadcast-type audio content source (with commercial breaks between songs), the analysis method used to identify the beginning and end of songs will be based on determining that songs are being received from a playing record, and that other songs are being received from the broadcast-type audio content source.

When an individual song is received as stored into the content buffer 208, the memory medium 106, or other memory medium, the storage location indicating where the song has been stored is determinable, That is, the storage location the beginning of the song and the end of the song is saved as the media device 102 is storing a received song into the content buffer 208, the memory medium 106, or other memory medium. Further, if different portions of a song are stored in different locations, the storage locations of the beginning and end of each portion are known. This storage location information is stored in the pointer table 226, and is associated with the particular predefined audio content source that is providing the song to the media device 102.

For example, the storage location of the beginning of the first song S1/SRC1 received from the fourth predefined audio content source (SRC4) is determined as that song is being saved. The storage location information corresponding to song's beginning is stored into the pointer table 226 along with an association of that particular predefined audio content source. The information stored into the pointer table 226 that identifies the beginning of the song is conceptually represented as "BEG LOC S1". Similarly, information corresponding to the determined storage location of the song's end is then stored into the pointer table 226. The information stored into the pointer table 226 that identifies the end of the song is conceptually represented as "END LOC S1". Accordingly, the information that identifies the song that is stored into the pointer table 226 may be conceptually represented as "S1/SRC4: BEG LOC S1/SCR4; END LOC S1/SCR4". When this first song (S1/SRC4) is to be played during a shuffle operation, embodiments may retrieve and play the entirety of this song by retrieving the location information from the pointer table 226, and then retrieving that song from the content buffer 208, the memory medium 106, or other memory medium based on the retrieved location information.

When a particular song stored in the content buffer 208, the memory medium 106, or other memory medium is selected for presentation during a shuffle operation, the processor system 204 accesses the storage location information for the beginning of that song from the pointer table 226. Based on the beginning storage location information, the processor system 204 retrieves the song and initiates presentation to the user. The storage location information that identifies the end of the song, in an example embodiment, is used to identify the end of the song. Accordingly, when the end of the song is reached, as determined by the ending storage location information from the pointer table 226, the processor system concludes presentation of that song and initiates retrieval and presentation of the next song. Alternative embodiments may determine the end of a song in other manners as described herein.

The various embodiments may present songs using any suitable shuffling order during a shuffle operation. FIG. 4 illustrates a serially ordered and repeated order of shuffling used in an example shuffle operation. In this example embodiment, a first song received from the first predefined audio content source SRC1 is initially played. When that first song has been played in its entirety, a second song from the second predefined audio content source SRC2 is played in its entirety. Then, when that second song has been played in its entirety, a third song from the third predefined audio content source SRC3 is played in its entirety. Next, when that third song has been played in its entirety, a fourth song from the fourth predefined audio content source SRC4 is played in its entirety.

In the conceptual shuffle operation example illustrated in FIG. 4, four example predefined audio content sources associated with the four audio content streams 402, 404, 406 and 408, respectively, are use to provide songs for the example shuffle operation. Thus, when the fourth song has been played in its entirety, the shuffling returns to play a fifth song from the first predefined audio content source SRC1. The process of shuffling through songs provided in the four audio content streams 402, 404, 406 and 408 continues in the above-described serial order until a conclusion of the shuffle operation.

Here, the exemplary shuffle operation is initiated at a time $T_0$ (denoted by an arrow with a circled numeral "0"). Play of the entirety of the first song S1 received from the first predefined audio content source SRC1 can begin at time $T_1$ (denoted by an arrow with a circled numeral "1") when the beginning 410 of the song S1/SCR1 is received at the media device 102. The presentation of the song S1/SCR1 continues until its ending has been played at a second time $T_2$ (denoted by an arrow with a circled numeral "2").

As the first song S1/SRC1 is being played, the songs received from the other predefined audio content sources are received at the media device 102. These songs S1/SRC2, S2/SRC3 and S1/SRC4 are saved in their entirety into the content buffer 208, the memory medium 106, or other memory medium as they are being received at the media device 102.

Thus, when playing of the first song S1/SRC1 concludes at the time $T_2$, a shuffling occurs to a song provided by the second predefined audio content source SRC2 (illustrated as the shuffled-to song S2/SRC2). Since at least the beginning of this song S1/SRC2 has already been received and stored in the memory medium 106, the stored initial portion of this song S1/SRC2 is retrieved and played (since the information identifying the beginning storage location of this song has been saved into the pointer table 226). The concluding or remaining portion of the song S1/SRC2 is saved as it is being received at the media device 102. Accordingly, the entirety of this songs S1/SRC2 is played as the second song during the example shuffle operation.

Presentation of the second song S1/SRC2 continues until its ending has been played at a third time $T_3$ (denoted by an arrow with a circled numeral "3"). Then, at the time $T_3$, a next shuffling occurs to the song provided by the third predefined audio content source SRC3. It is appreciated that presentation of the song S1/SRC2 concludes at a later time than a time that the end of the song S1/SRC2 is actually received at the media device 102 because a first time delay ($T_{d1}$) is incurred due to an amount of time (a delay duration) associated with the retrieval and presentation of the stored initial portion of this second presented song S1/SRC2 from the content buffer 208, the memory medium 106, or other memory medium.

In the example shuffle operation illustrated in FIG. 4, currently received songs in any particular predefined audio content source are presented when that particular predefined audio content source is selected in the shuffling process. Here, the currently received song that has been saved from the next shuffled-to audio content source SRC3 is the second song S2/SRC3. That is, the beginning of this second song S2/SRC3 has been received and saved.

Since at least the beginning of this song S2/SRC3 has already been received and stored in the content buffer 208, the memory medium 106, or other memory medium, this beginning of this song S2/SRC3 is retrieved and played (since the information identifying the beginning storage location of this song has been saved into the pointer table 226).

Further, in this example shuffle method, it is appreciated that the previously received song S1/SRC3 is not played in view that the entirety of the second song S2/SRC3 will be available for presentation. In embodiments that employ this exemplary shuffling process, this previously received and stored song S1/SRC3 may be deleted, erased, discarded or otherwise overwritten (interchangeably referred to herein as being deleted). When the shuffling process plays the entirety of a currently received song, previously received and stored songs from that particular predefined audio content source may be deleted. Accordingly, the required memory capacity of the content buffer 208, the memory medium 106, or other memory medium may be managed in an improved fashion. That is, the memory capacity of the content buffer 208, the memory medium 106, or other memory medium may be less than memory capacity that is otherwise required in an embodiment that saves and retains all received songs from the plurality of predefined audio content sources (see for example, FIG. 5 which illustrates operation of such an embodiment where the first song S1/SRC3 is played after the conclusion of the song S1/SRC2).

Continuing with the conceptual shuffle operation illustrated in FIG. 4, a next shuffling occurs at the end of the song S2/SRC3 received from the third predefined audio content source SRC3. This next shuffling operation is denoted as occurring at a fourth time $T_4$ (denoted by an arrow with a circled numeral "4"). The fourth song to be played in this exemplary shuffling sequence is the currently received song S3/SRC4 received from the fourth predefined audio content source SRC4. This song S3/SRC4 is selected due to the effect of the time delay $T_{d2}$ associated with retrieving and playing the initial portion of the third presented song S2/SRC3.

Next, a shuffling to a fifth song provided by the first predefined audio content source SRC1 occurs. This shuffling occurs at time $T_5$ (denoted by an arrow with a circled numeral "5"). The delay in shuffling time from the fourth predefined audio content source SRC4 back up to the first predefined audio content source SRC1 is delayed by some duration, $T_{d3}$. The shuffled-to song at that time $T_4$ will be the song S4/SRC1, which will be played in its entirety.

The above-described shuffling process continues as currently received songs in the four predefined audio content sources are received. Shuffling continues in the above predefined order of the four predefined audio content sources. In this embodiment, played songs and/or songs that are not played (such as the example songs S1/SRC3, S1/SRC4, S2/SRC4, S2/SRC1, and S3/SRC1) may be deleted from the content buffer 208, the memory medium 106, or other memory medium. When the shuffling process concludes, an example embodiment may delete all saved songs.

In an alternative embodiment, at least one song from one of the predefined audio content sources may be saved in the content buffer 208, the memory medium 106, or other memory medium. For example, but not limited to with respect to the example embodiment described in FIG. 4, the last song played during the previous shuffle operation that was received from the first predefined audio content source (SRC1) may be saved. Thus, when the shuffle operation is initiated at the initial time ($T_0$), at least one song in its entirety can be retrieved from the content buffer 208, the memory medium 106, or other memory medium so that play can immediately begin. Any number of songs may be retained from a previous shuffle operation. Further, an alternative embodiment may save the last complete received song that was saved in the content buffer 208, the memory medium 106, or other memory medium. Alternatively, or additionally, the currently played song, or last played song, during the previous shuffle operation may be saved in its entirety for later play during the subsequently initiated shuffle operation. If the concluding part of this last song has not yet been played and/or received, the media device 102 continues to save this last played song until it ends.

The shuffle operation may be concluded in a variety of manners. In an example embodiment, the user enters into a suitable GUI, such as the audio content shuffle GUI 236, and actuates or selects a selectable region (not shown). Alternatively, or additionally, the user may actuate one or more controllers 232 disposed on the surface of the remote control 230. Alternatively, or additionally, the user may simply turn off the media device 102. Any suitable means of ending the shuffle operation may be used.

The above-described embodiment in FIG. 4 rotated through the example four predefined audio content sources in a predefined order (from SRC1 to SRC2 to SRC3 to SRC4, and then returning to SRC1). Any number of predefined audio content sources may have been used. Alternatively, or additionally, the shuffling order that the four predefined audio content sources may have been random. A suitable randomization means would be used to select that next predefined audio content source that would provide the next song upon conclusion of the currently played song.

FIG. 5 is a diagram conceptually indicating content stored in the pointer table 226. As songs are received from the plurality of predefined audio content sources storage location information corresponding to song's beginning and the song's end, along with the association of that particular predefined audio content source that provided that particular song, is stored into the pointer table 226. Thus, when that song is retrieved in its entirety from the content buffer 208, the memory medium 106, or other memory medium, the information in the pointer table 226 enables the processor system 204 to retrieve and present that song. For example, with respect to the songs conceptually illustrated in FIG. 4, the location information for the song S1/SRC1 is "S1/SRC1: BEG LOC S1/SCR1; END LOC S1/SCR1" which is stored at the portion 502 of the pointer table 226.

Further, this example embodiment of FIG. 5 illustrates an alternative shuffle operation process. In some situations, the user may wish to hear all songs received during a shuffle operation that are received from the plurality of predefined audio content sources. Some media devices 102 may have a relatively large capacity content buffer 208, memory medium 106, or other memory medium. For example, an embodiment may store the songs in the DVR 210 (FIG. 2). Alternatively, or additionally, a memory medium such as a flash drive memory or the like may be coupled to the media device wherein songs received during the shuffle operation are saved. Alternatively, or additionally, an audio content device 136 may be configured to receive and store songs during a shuffle operation.

In such embodiments, all songs received from the predefined audio content sources are saved. During a shuffle operation, a first song is played from a first one of the predefined audio content sources. Shuffle progresses through the other predefined audio content sources, either in a predefined order or randomly. When the shuffling returns to the first predefined audio content source, the next saved song that was received from that first predefined audio content source is retrieved and played from the content buffer 208, the memory medium 106, or other memory medium.

FIG. 5 illustrates an exemplary pointer table 226 that is saving storage location information for three predefined audio content sources (SRC1, SRC2, and SRC3). In each region of the pointer table 226, the storage location information corresponding to song's beginning and end is saved. For example, the storage location information for the first predefined audio content source, songs S1 through Si has been saved. When a next song is received for the first predefined audio content source, the storage location information for that next song will be stored into the pointer table 226 (following the entry for the previously received song Si/SRC1).

In practice, when the first song (S1/SRC1) received from the first one of the predefined audio content sources is to be played during shuffle operation, the processor system 204 (FIG. 2) access the storage location information "S1/SRC1: BEG LOC S1/SCR1; END LOC S1/SCR1" from the pointer table 226. Based on the retrieved storage location information, this first song S1/SRC1 is retrieved from is identified storage location in the content buffer 208, the memory medium 106, or other memory medium. Here, the first song is identified (S1/SRC1) and is associated with the first predefined audio content source SRC1. The information identifying the beginning location of the first song S1/SRC1 is conceptually indicated as "BEG LOC S3/SRC1" in the pointer table 226. The end location of the first song S1/SRC1 is conceptually indicated as "END LOC S3/SRC1" in the pointer table 226.

The beginning and end locations of stored songs may be identified using any suitable location information that identifies storage locations in the content buffer 208, the memory medium 106, or other memory medium. Physical addresses and/or virtual addresses may be used. For example, if the first song S1/SRC1 is stored on a disk type drive memory medium, then the location information may specify a particular logical block address in the disk (cylinder/head/sector). Any suitable format may be used for specifying storage location information by the various embodiments.

In the example shuffle operation illustrated in FIG. 5, the shuffle order is illustrated as being in a predefined order that proceeds from the first predefined audio content source to the second predefined audio content source, and then to the third predefined audio content source. In FIG. 5, the shuffling for the first three songs is identified by a solid-line arrow, where a circled number indicates the shuffle number. For example, at the conclusion of playing the first song S1/SRC1, the shuffle operation moves to the next song S1/SRC2 to play that song in its entirety, as indicated with the solid-line arrow with the numeral "1" thereon. At the conclusion of playing the second song S1/SRC2, the shuffle operation moves to the next song S1/SRC3 to play that song in its entirety, as indicated with the solid-line arrow with the numeral "2" thereon.

After the song from the third predefined audio content source has been played in its entirety, the shuffling returns to the second song S2/SRC1 that was received the first predefined audio content source, as indicated with the solid-line arrow with the numeral "3" thereon. Three complete shuffling cycles, in a predefined order, are illustrated in FIG. 5. In some embodiments, the shuffling order between the plurality of predefined audio content sources may be random.

The example shuffle operation continues until ended by the user. In an example embodiment, the stored songs are deleted from the content buffer 208, the memory medium 106, or other memory medium at the conclusion of the shuffle operation. Accordingly, memory capacity of the content buffer 208, the memory medium 106, or other memory medium may be managed.

Alternatively, some embodiments may save one or more of the songs from the predefined audio content sources for a subsequent shuffle operation. For example, the last received song Si/SRC1 may be saved (while all other songs are deleted). Here, when the subsequent shuffle operation is initiated, that last-received song Si/SRC1 is available for immediate play, thus providing sufficient time for at least the beginning portion the first song next predefined audio content source (such as the song S1/SRC2 of the second predefined audio content source) to be received at the media device 102. Such an embodiment is particularly effective in the event that the predefined audio content sources for the subsequent shuffle operation includes at least this first predefined audio content source.

However, in some situations, the user may have deleted or removed this first example predefined audio content source from the plurality of predefined audio content sources that are to be used in the subsequent shuffle operation. For example, the previous shuffle operation may have been oriented by the user towards rock and roll themed music. The subsequent shuffle operation may be. for example, changed by the user to be oriented towards holiday-themed music. Thus, if the first predefined audio content source in not included in the listing of predefined audio content sources for a newly initiated shuffle operation, that saved song Si/SRC1 may not be played. Rather, another song would need to be played.

Some embodiments may save at least one last-received song from each of the predefined audio content sources (or alternatively, from at least some number of the predefined audio content sources). Thus, if at least one of the previously predefined audio content sources are included in the listing of predefined audio content sources for the subsequent shuffle operation, at least one song is immediately available for play when the subsequent shuffle operation is initiated by the user.

In embodiments that save songs in accordance with the shuffle operation illustrated in FIG. 5, it is possible that the memory capacity of the content buffer 208, the memory medium 106, or other memory medium may become fully utilized, or reach a predefined capacity limit, at some point in the shuffle operation. That is, the content buffer 208, the memory medium 106, or other memory medium may become full. For example, a large number of predefined audio content sources may result in a large number of songs being concurrently received and save at the media device 102. Alternatively, or additionally, the duration of the shuffle operation may be relatively long such that a large number of songs are received and saved.

In situations where the capacity of the content buffer 208, the memory medium 106, or other memory medium becomes fully utilized or reaches a predefined capacity threshold, embodiments may be configured to begin a process of selectively deleting previously received and stored songs from the content buffer 208, the memory medium 106, or other memory medium. An example embodiment deletes previously played songs when the capacity becomes fully utilized or reaches a predefined capacity limit. Alternatively, or additionally, previously played songs may be deleted after they have been played.

Alternatively, or additionally, embodiments may stop storing newly received songs that are provided by the predefined audio content sources until a sufficient number of previously received and stored songs have been played and then deleted. When additional memory capacity becomes available, the process of receiving and storing received songs may resume.

It should be emphasized that the above-described embodiments of the audio content shuffle system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
   a plurality of interfaces configured to receive at least an audio content stream from one of a plurality of predefined audio content sources,
      wherein the audio content stream comprises a plurality of songs that are serially received at one of the plurality of interfaces,
      wherein each one of the plurality of predefined audio content sources provide at least one different audio content stream to the media device,
      wherein the plurality of predefined audio content sources have been predefined by a user to provide songs that are to be presented during a shuffle operation, and
      wherein identifiers of each of the plurality of predefined audio content sources are stored at the media device;
   a memory medium communicatively coupled to the plurality of interfaces and configured to store each of the serially received songs as each song is being received at the plurality of interfaces, and configured to store each of the songs as they are received from the other ones of the predefined audio content sources;
   a pointer table that has storage location information for each of the songs stored in the memory medium, wherein the storage location information for each song defines at least:
      a beginning location information that indicates a location where a beginning of each song is stored in the memory medium; and
      an identifier that uniquely identifies each song and the predefined audio content source that provided the song; and
   a processor system communicatively coupled to the memory medium and the plurality of interfaces, wherein during a shuffle operation that presents a shuffled series of songs received from the plurality of predefined audio content sources, the processor system is configured to:
  select a first predefined audio content source from the plurality of predefined audio content sources;
  select a first song having at least a beginning portion that is stored in the memory medium and that was provided by the selected first predefined audio content source;
  retrieve from the pointer table, based on the identifier of the selected first song, the beginning location information that indicates where the beginning of the first song is stored in the memory medium;
  in response to completing presentation of a current song to the user, retrieve the beginning portion of the first song from the memory medium such that the first song is then presented to the user in its entirety; and
  select a second predefined audio content source from the plurality of predefined audio content sources that is to provide a second song that is to be presented to the user upon conclusion of the presentation of the first song,
wherein a first interface of the plurality of interfaces comprises a tuner that is tuned to receive a broadcast of an audio content stream being broadcast by the first predefined audio content source, wherein each song received from the first predefined audio content source is stored into the memory medium as it is received via the communication system,
wherein a second interface of the plurality of interfaces is configured to establish a link to a remote media content device via an intervening communication system, wherein each song received from the remote media content device is stored into the memory medium as it is received via the communication system,
wherein a third interface of the plurality of interfaces is configured to communicatively couple to a record player that provides songs from a playing record, wherein each song received from the record player is stored into the memory medium as it is received from the record player, and
wherein a fourth interface of the plurality of interfaces is, configured to communicatively couple to a compact disc (CD) player that provides songs from a playing CD, wherein each song received from the CD player is stored into the memory medium as it is received from the CD player.

2. The media device of claim 1, wherein the first interface further comprises a plurality of tuners, wherein the processor system is further configured to:
  operate each one of the tuners to receive an audio content stream provided by one of the plurality of predefined audio content sources;
  store each song as it is received at each of the plurality of tuners in the memory medium; and
  for each stored song, save into the pointer table the beginning location information and the identifier of the predefined audio content source that provided the song.

3. The media device of claim 1, wherein the memory medium is a first memory medium, and wherein the media device further comprises:
  a second memory medium communicatively coupled to the processor system that stores the pointer table.

4. The media device of claim 1, wherein the processor system is configured to:
  generate an audio content shuffle graphical user interface (GUI) based on the identifier that uniquely identifies each of the plurality of predefined audio content sources stored in the pointer table,
  wherein the audio content shuffle GUI, when presented on a display, presents information that identifies each of the predefined audio content sources, and
  wherein the audio content shuffle GUI is configured to receive input from the user to change the identified plurality of predefined audio content sources that will be used in a subsequent shuffle operation.

5. The media device of claim 4, further comprising:
  electronic program guide (EPG) information that is stored at the media device,
  wherein the processor system is further configured to:
    generate an EPG that is presented to the user;
    receive an add selection of an audio content source made by the user via the presented EPG;
    add the selected audio content source as a new member of the plurality of predefined audio content sources that will be used in the subsequent shuffle operation;
    receive an remove selection of an audio content source made by the user via the presented EPG; and
    remove the selected audio content source as a member of the plurality of predefined audio content sources that will be used in the subsequent shuffle operation.

6. The media device of claim 1, wherein the memory medium is a content buffer that is configured to output a stream of audio information, and a stream of video information if present, to components of a media presentation system that includes a display and at least one speaker.

7. The media device of claim 1, wherein the memory medium is a digital video recorder (DVR) that is configured to store media content received by the media device.

8. The media device of claim 1, wherein the tuner that is tuned to receive a broadcast of a first audio content stream from the first predefined audio content source is a radio frequency (RF) tuner that is configured to detect an over-the-air wireless signal broadcasted by the radio station, wherein each song received from the radio station is stored into the memory medium as it is received via the communication system.

9. A method that shuffles songs presented by a media device, the method comprising:
  receiving, at the media device comprising a plurality of interfaces, user specification of a plurality of predefined audio content sources, wherein the plurality of predefined audio content sources provide a plurality of songs presented during a shuffle operation at the media device;
  storing, at the media device, information identifying each of the plurality of predefined audio content sources based on the received user specification of the plurality of predefined audio content sources;
  concurrently receiving, during a shuffle operation, a stream of audio content from each one of the plurality of predefined audio content sources, wherein each of the streams of audio content comprises a plurality of songs that are serially received at the media device;
  storing each song in a memory medium of the media device, wherein each song is stored as the song is received at the media device;
  storing, in a pointer table at the media device, beginning location information that indicates a location where a beginning of each song is stored in the memory medium of the media device;

storing, in the pointer table at the media device, an identifier that uniquely identifies each song and the predefined audio content source that provided the song;

selecting a first predefined audio content source from the plurality of predefined audio content sources;

selecting a first song having at least a beginning portion that is stored in the memory medium and that was provided by the selected first predefined audio content source;

retrieving from the pointer table, based on the identifier of the selected first song, the beginning location information that indicates where the beginning of the first song is stored in the memory medium;

in response to completing presentation of a current song to the user, retrieving the beginning portion of the first song from the memory medium such that the first song is then presented to the user in its entirety;

selecting a second predefined audio content source from the plurality of predefined audio content sources that is to provide a second song that is to be presented to the user upon conclusion of the presentation of the first song;

receiving a first plurality of songs at a first interface of the plurality of interfaces, the first interface having a tuner that receives a broadcast of a first audio content stream from the first predefined audio content source, wherein each of the first plurality of songs received from the remote media content device is stored into the memory medium as they are received at the media device;

receiving a second plurality of songs at a second interface of the plurality of interfaces, wherein the second interface is configured to establish a link to a remote media content device via an intervening communication system, wherein the second plurality of songs are received from the remote media content device, and wherein each of the second plurality of songs received from the remote media content device are stored into the memory medium as they are received at the media device;

receiving a third plurality of songs at a third interface of the plurality of interfaces, wherein the third interface is configured to communicatively couple to a record player to receive the third plurality of songs from the record player, wherein the third plurality of songs are received from the record player that provides the third plurality of songs from a playing record, and wherein each of the third plurality of songs received from the record player are stored into the memory medium as they are received at the media device; and receiving a fourth plurality of songs at a fourth interface of the plurality of interfaces, wherein the fourth interface is configured to communicatively couple to a compact disc (CD) player to receive the fourth plurality of songs from the CD player, wherein the fourth plurality of songs are received from the CD player that provides the fourth plurality of songs from a playing CD, and wherein each of the fourth plurality of songs received from the CD player are stored into the memory medium as they are received at the media device.

10. The method of claim 9, further comprising:

retrieving from the pointer table, based on the identifier of the selected second song, the beginning location information that indicates where the beginning of the second song is stored in the memory medium; and in response to completing presentation of the first song to the user, and based on the beginning location information that indicates Where the beginning of the second song is stored in the memory medium, retrieving the beginning portion of the second song from the memory medium such that the second song is then presented to the user in its entirety.

11. The method of claim 10, further comprising:

selecting a third predefined audio content source from the plurality of predefined audio content sources, wherein the third predefined audio content source provides a third song that is to be presented to the user upon conclusion of the presentation of the second song;

retrieving from the pointer table, based on the identifier of the selected third song, the beginning location information that indicates where the beginning of the third song is stored in the memory medium; and in response to completing presentation of the second song to the user, and based on the beginning location information that indicates where the beginning of the third song is stored in the memory medium, retrieving the beginning portion of the third song from the memory medium such that the third song is then presented to the user in its entirety.

12. The method of claim 9, wherein the tuner of the first interface is a first tuner, wherein the first interface comprises a second tuner, and wherein storing each song in a memory medium of the media device comprises:

operating the first tuner of the media device to tune to a first channel associated with a broadcast first audio content stream with the first song therein that was provided by the first predefined audio content source; and operating the second tuner of the media device to tune to a second channel associated with a broadcast second audio content stream with the second song therein that was provided by the second predefined audio content source.

13. The method of claim 9, wherein prior to completing presentation of the current song to the user, the beginning portion of the first song is received and stored at the media device, wherein upon completing presentation of the current song to the user a concluding portion of the first song has not yet been received and stored at the media device, the method further comprising:

storing the concluding portion of the first song in the memory medium as the concluding portion of the first song is received at the media device, wherein the concluding portion of the first song is received and stored as the beginning portion of the first song is retrieved from the memory medium of the media device; and retrieving the concluding portion of the first song from the memory medium of the media device after the beginning portion of the first song has been presented to the user.

14. The method of claim 9, wherein prior to the selection of the second predefined audio content source from the plurality of predefined audio content sources, the method further comprising:

storing at least a beginning portion of the second song in the memory medium as the second song is received at the memory medium, wherein the second song resides in the received stream of audio content associated with the second predefined audio content source, and wherein the second song is received while the first song is being presented to the user.

15. The method of claim 9, wherein receiving the user specification of the plurality of predefined audio content sources comprises:
- presenting a content shuffle graphical user interface (GUI) on a display,
  - wherein the content shuffle GUI indicates the plurality of predefined audio content sources associated with a previous shuffle operation, and
  - wherein the content shuffle GUI indicates a plurality of other audio content sources that are selectable by the user;
- receiving a first user selection of one of the indicated plurality of predefined audio content sources associated with a previous shuffle operation, wherein the user selected predefined audio content source is deselected from the plurality of predefined audio content sources to be used in a subsequent shuffle operation; and
- receiving a second user selection of one of the indicated plurality of other audio content sources, wherein the user selected other audio content source is defined as one of the plurality of predefined audio content sources to be used in the subsequent shuffle operation.

\* \* \* \* \*